E. F. Dehart.
Stalk Cutter.
N° 85,570.   Patented Jan. 5, 1869.
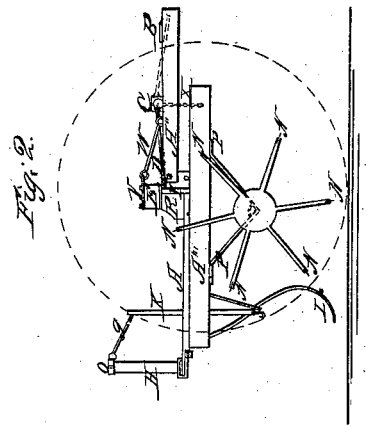
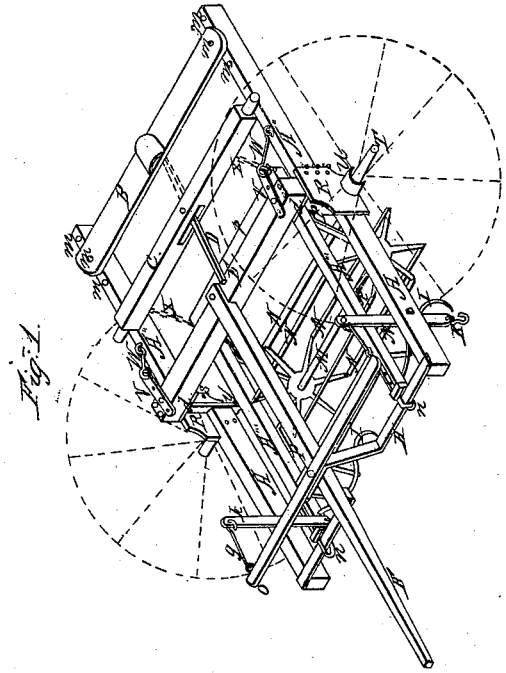
Witnesses:
Inventor:
E. F. Dehart.

United States Patent Office.

E. F. DEHART, OF SWAN CREEK, ILLINOIS.

Letters Patent No. 85,570, dated January 5, 1869.

---

IMPROVEMENT IN COMBINED CULTIVATOR AND STALK-CUTTER.

---

The Schedule referred to in these Letters Patent and making part of the same.

---

*To all whom it may concern:*

Be it known that I, E. F. DEHART, of Swan Creek, Warren county, Illinois, have invented a new and improved Combined Cultivator and Harrow; and I do hereby declare that the following is a full, clear, and exact description thereof, which will enable others skilled in the art to make and use the same, reference being had to the accompanying drawings, forming part of this specification, in which—

Figure 1 is a perspective view of my invention.
Figure 2, a side view.
Similar letters of reference indicate like parts.

This invention relates to an improved frame, to which may be attached either cultivators or a stalk-cutting device; and The invention consists in the peculiar construction of the frame, whereby it may be made peculiarly suitable for either purpose.

Letter R, in the drawings, is a metal plate, with the spindle T, sand-plate U, and rib $y$ cast solid thereon.

Letter A, in the drawings, is the forward part of the main frame.

Letter H is the metal bar connecting the front part of frame A, and raised in front for supporting the tongue F and draught-bar O.

O, $g$, K is the draught-device.

Letter E may be called the axle, and is attached to the top of plates R.

Letters A″ A″ are the rear part of the main frame, and may be adjusted vertically by means of the holes $s\ s\ s$ and device V W, in order to bring the driver's seat B nearer to or further from the ground in plowing, smaller or higher plants.

Letter $m$ represents holes for adjusting the driver's seat to balance the machine under different circumstances.

Letters $d\ d$ are plates, cast solid, and forming a part of the plates R R, and used for attaching the plates R to the axle E.

Letters A‴ A‴, $p$, represent the frame of a stalk-cutter, and attached by the clevis $n$ to the cross-bar H, forward of the main frame A A.

This arrangement, it will be seen, brings the hitch of the stalk-cutter near to the horses, and thus presents a great advantage in draught.

Letter C is a roller, connected to the frame A‴ A‴, $p$, by the chain X, and, when attached, by turning back and bringing the lever D in the position shown by the dotted line, under the seat-board B, it will raise the stalk-cutter frame from the ground, and hold it up while moving from place to place, &c. Then, when in use, the lever may be brought forward, or it and the roller may be laid to one side.

The joint $n$, for attaching the stalk-cutter frame A‴ A‴ to the bar H, is made to allow vertical movement of the frame A‴ $p$, but holds firmly laterally.

When desired, the frame A A″ may be used as a cultivator-frame, by attaching any of the ordinary double-shovel plows to the bar H.

The stalk-cutter M N is constructed in one of the ordinary forms, and is suspended from or attached to the frame A‴ A‴, by means of the V-shaped arms P P, fig. 2.

Letters I I represent hooks for drawing the stalks beneath the cutting-surface of the knives N.

What I claim as new, and desire to secure by Letters Patent, is—

The arrangement of the frame A A″ with the plates R R, cross-bar H, and seat B, substantially as described, and for the purpose set forth.

E. F. DEHART.

Witnesses:
W. B. RICHARDS,
J. B. HARSH.